United States Patent
Ernst et al.

(10) Patent No.: US 6,723,149 B2
(45) Date of Patent: Apr. 20, 2004

(54) SEPARATOR FOR LIQUIDS COMPRISING A SEPARATING CARTRIDGE, PARTICULARLY FOR SEPARATING OIL FROM CRANKCASE GASES

(75) Inventors: Volker Ernst, Sachsenheim (DE); Heinz Jawurek, Neudenau (DE); Herbert Jainek, Heilbronn (DE)

(73) Assignee: Filterwerk Mann & Hummel GmbH, Ludwigshafen (DE)

( * ) Notice: Subject to any disclaimer, the term of this patent is extended or adjusted under 35 U.S.C. 154(b) by 31 days.

(21) Appl. No.: 09/988,825

(22) Filed: Nov. 20, 2001

(65) Prior Publication Data

US 2002/0088212 A1 Jul. 11, 2002

Related U.S. Application Data

(63) Continuation of application No. PCT/EP00/04144, filed on May 10, 2000.

(30) Foreign Application Priority Data

May 20, 1999 (DE) .......................................... 199 23 093

(51) Int. Cl.[7] .............................................. B01D 29/21
(52) U.S. Cl. .......................... 55/498; 55/321; 55/324; 55/325; 55/330; 55/498; 55/502; 55/514; 55/521; 55/DIG. 19; 55/DIG. 28; 55/385.3; 123/198 E; 123/573; 210/493.1; 210/493.2; 210/493.5; 210/450
(58) Field of Search .......................... 55/321, 324, 325, 55/330, 385.3, 498, 502, 514, 521, DIG. 19, DIG. 28; 123/198 E, 573; 210/493.1, 493.2, 493.5, 450

(56) References Cited

U.S. PATENT DOCUMENTS 4,082,071 A    4/1978   Jones
5,413,712 A  * 5/1995   Gewiss et al. ........... 210/493.1
5,586,996 A  * 12/1996  Manookian, Jr. ............ 55/330
5,685,985 A  * 11/1997  Brown et al. ............ 200/493.2
5,797,973 A  * 8/1998   Dudrey et al. ................ 55/498
5,964,909 A  * 10/1999  Brunner ....................... 55/502
6,153,098 A  * 11/2000  Bayerlein et al. ............. 55/498
6,261,333 B1 * 7/2001   Dickson ...................... 55/502
6,290,739 B1 * 9/2001   Gieseke et al. ............... 55/502
6,299,662 B1 * 10/2001  Poulsen ....................... 55/502

FOREIGN PATENT DOCUMENTS

| DE | 2324575   | 1/1974  |
|----|-----------|---------|
| DE | 4241586   | 1/1994  |
| DE | 9320399.3 | 8/1994  |
| DE | 4416577   | 11/1994 |
| DE | 19645666  | 5/1998  |

OTHER PUBLICATIONS

German Search Report w/Translation.

* cited by examiner

Primary Examiner—Minh-Chau T. Pham
(74) Attorney, Agent, or Firm—Crowell & Moring LLP

(57) ABSTRACT

A separator for liquid, in particular for removing oil from crankcase gases, having a cover (11) into which a mount (13) for a cylindrical separating cartridge (14) is incorporated. The separating cartridge is composed, for example, of a non-woven separating material (20) wound around a support body (22) having end plates (33) on the end faces (32) of the support body. The end plates (33) may be composed, for example, of a two-component synthetic resin material. This results in a stable component which can be sealed utilizing the elasticity of the end plate (33) when pushed into the mount (13). This results in a cost effective exchangeable part in which several seals are saved in the complete structural component and yields a structural unit having increased economic effectiveness.

18 Claims, 2 Drawing Sheets

SEPARATOR FOR LIQUIDS COMPRISING A SEPARATING CARTRIDGE, PARTICULARLY FOR SEPARATING OIL FROM CRANKCASE GASES

CROSS REFERENCE TO RELATED APPLICATIONS

This application is a continuation of international patent application no. PCT/EP00/04144, filed May 10, 2000 designating the United States of America, the entire disclosure of which is incorporated herein by reference. Priority is claimed based on Federal Republic of Germany patent application no. DE 199 23 093.5, filed May 20, 1999.

BACKGROUND OF THE INVENTION

The invention relates to a separator for liquids, particularly for purifying crankcase gases by removing entrained oil droplets therefrom. The invention further relates to a separating cartridge that is suitable for installation in the aforementioned liquid separator.

An oil separator using a replaceable separating cartridge is known, for example, from published German patent application no. DE 196 45 666 A1. The separating cartridge is installed in a housing in such a way that a seal is formed between a treated gas zone and an untreated gas zone, i.e., between the oil-containing air and the nearly oil-free air, so that the gas stream to be purified must flow through a separating area of the separating cartridge. The separated liquid can exit the housing through an outlet.

The separating cartridge can be replaced when the dirt contained in the gas stream has clogged the separating material of the cartridge and the pressure drop produced by the cartridge increases to an excessive level. Since the separating cartridge is a replaceable part, the economic efficiency of the liquid separator essentially depends on the cost of the replacement cartridges. The separating cartridge proposed in the aforementioned document therefore has a simple construction. It comprises a cup-shaped support around which the separating material is wound. This simple construction has drawbacks, however. The winding of the separating material on the support can result in leaks along the edge areas at the end faces. Furthermore, the separating cartridge or the associated retainer in the housing of the liquid separator must be provided with seals to ensure proper functioning of the component. This reduces the economic efficiency that the simple construction of the separating cartridge is intended to provide. Besides, concessions must be made regarding the functional reliability of the separating cartridge.

U.S. Pat. No. 4,082,071 discloses an oil separator in which a flaccid nonwoven fabric is wound around a support body. End plates are subsequently joined to the support body and the nonwoven fabric on the end faces. These end plates simultaneously ensure a tight installation in the associated housing. The construction of this oil separating element is rather complex, however, so that the replacement part is expensive to produce. As a result, the oil separator is costly to maintain.

On the other hand, German patent no. DE 42 41 586 discloses an air filter element in which the filter element needs no support tube. The supporting mechanism is instead incorporated into the housing so that it does not need to be replaced each time the filter cartridge is replaced. This permits a cost-effective production of the filter element. However, an oil separator of this type cannot be removed due to the generally flaccid components that are being used as the filter medium. These components require direct support, so that a filter element with a nonwoven fabric could not be pushed onto a support body that is permanently installed in the filter housing.

SUMMARY OF THE INVENTION

Thus, it is an object of the invention to provide a liquid separator which uses a simply constructed separating cartridge that is cost-effective to produce and at the same time ensures high component reliability. It is also an object of the invention to provide a simply constructed, cost effective and highly reliable separating cartridge for use in a liquid separator.

In accordance with a first aspect of the invention, the objects are achieved by providing a liquid separator for separating liquid entrained in a gas flow, the separator comprising a housing with a cover having an inlet and an outlet for a gas to be purified and a drain for separated liquid; a mount for a separating cartridge; and a substantially cylindrical separating cartridge received on the mount; wherein the separating cartridge comprises a separating means wound around a support member with end disks on both axial end faces thereof; wherein the end disks engage the mount to form a seal and together with the support member form a sealed assembly which divides the separator into an untreated gas zone and a treated gas zone, and wherein the mount is constructed as a nipple that is gas permeable in the area between the end disks of the separating cartridge.

In another aspect of the invention, the objects are achieved by providing a substantially cylindrical separating cartridge comprising a separating means wound around a support member with end disks on both axial end faces thereof; wherein the end disks together with the support member are engagable with a mount to form a sealed assembly which divides a liquid separator into an untreated gas zone and a treated gas zone.

The liquid separator according to the invention has a housing that can be sealed in known manner by a cover. Appropriate connections are provided to permit the passage of the gas to be purified and the drainage of the separated liquid. The liquid separator uses a separating cartridge having separating means to separate the liquid and support member to ensure the shape stability of the cartridge. According to the invention, the separating cartridge is constructed in such a way that it has an end disk on at least one of its end faces, which engages or interacts with an associated mount in the housing to form a seal. The end disks may also be fixedly attached to the supporting member, in which case a seal is created between the end disk and the supporting member. This eliminates the need for separate gaskets or seals for installing the cartridge in the housing. The reduction in number of necessary individual components reduces component and assembly costs, not least of all due to material savings. This is also an additional safety factor since it prevents assembly errors when the separating cartridge is being replaced, e.g., the inadvertent omission of a seal. Furthermore, the end disks advantageously lead to a reliable sealing of the separating means. Any undesirable short circuit flow of the gas stream to be purified can thus be counteracted.

All types of known separating materials may be used for the separating means. Particularly suitable are materials that can be wound around the preferably tubular supporting member. In addition to nonwoven separating materials, the separating means may, in particular, comprise a yarn winding.

The primary task of the separating means is to separate a liquid phase from the gas phase. This liquid phase is collected and discharged from the separating arrangement with the aid of a drain. However, the separating means also serve to retain particles contained in the gas to be purified. These particles remain in the separating means and consequently determine the service life of the separating cartridge. To extend this service life, an additional separating stage that is suitable primarily for separating particles may be provided. The separation of the fluid may also be done in several stages. In particular, the supporting member can assume an additional separation function. The supporting member may, for instance, be made from a porous material to separate ultrafine droplets of liquid from the gas phase.

According to a further embodiment of the invention, the separating cartridge is free from metal. This has substantial advantages for the disposal of used separating cartridges since they can be incinerated in a waste-to-energy system.

There are several variants for the further embodiment of the end disks. These variants may also be combined. The separating means as well as the supporting member can, for instance, be embedded in an end disk made of nitrile-butadiene rubber. This material expands with heat during production of the cartridge and thereby encloses the end face areas of the separating means and the supporting member. This bond simultaneously creates the required seal.

Another option is to produce the end disks from a multicomponent synthetic resin material or plastic. It is possible to use foams, which expand similarly to an end disk made of nitrile-butadiene rubber and thereby produce the connection to the separating means and the supporting member. Another possibility is to provide the end face areas of the separating means and/or the supporting member with a preferably liquid component and to contact it with another, preferably more solid, component so that the end disk cures with a certain residual elasticity. Another option is to use elastic end disks that are joined to the end faces of the separating means and the supporting member, e.g., by gluing.

Alternatively, the end disks may also be produced together with the supporting member as a single part. This creates a basic body that is comparable to the structure of a yarn reel. The separating means can then be wound around this basic body.

A seal of the assembly comprising the end disk, supporting member and separating means may also be achieved by compressing them in this area. Compression of the separating means can be accomplished by various means, e.g., by a cable tie, which is slung around the separating means and drawn tight. Instead of using a cable tie, a thread may be incorporated into the nonwoven fabric.

The supporting member itself must be gas permeable. The cylindrical separating cartridges have two end faces, and it is advantageous to provide both end faces with the same type of end disks. Depending on the application, however, another design may also be selected.

The mount provided inside the housing of the liquid separator for the separating cartridge is advantageously provided with locking devices suitable to fix the separating cartridge in installed position. These devices may, for instance, consist of locking projections that are attached to a cylindrical fitting. The separating cartridge is then pushed onto this fitting until the locking projections engage underneath one of the end disks. Other fixation options are also feasible, however. For instance, the surface pressure which is created by the intrinsic elasticity of the end disks and which produces the sealing effect can be simultaneously used as a friction lock between the retainer and the separating cartridge. Another option would be a bayonet catch.

If the retainer for the separating cartridge is constructed in the form of a nipple, it must be gas permeable in the area between the end disks of the separating cartridge in order to allow the gas to be purified to pass through it. The nipple can also assume certain separating functions. This is possible, in particular, if the gas to be purified is guided from the inside toward the outside. The gas then first passes through the nipple, so that a preliminary separation of the fluid can occur, and then passes through the separating material of the separating cartridge.

According to one advantageous embodiment of the inventive concept, the fitting can be provided with a return flow valve for the separated liquid. While the separator is in operation, the return flow valve is closed to prevent unpurified gas from bypassing the separator. If the oil separator stops operating or if a certain amount of separated fluid has collected, then the return flow valve opens so that the separated fluid can be discharged from the nipple.

The fitting advantageously forms a single part together with the cover of the housing. To facilitate molding of the individual parts, they can be produced separately and subsequently permanently connected, particularly by welding. The advantage of the one-piece construction is that it saves a seal.

A separating cartridge in accordance with the invention is characterized in that it is suitable for installation in a liquid separator according to the invention. Alternatively, however, this separating cartridge can also be used without a housing at installation sites where a liquid must be separated from a gas phase in a closed system. This is required, for instance, in the oil system of an internal combustion engine. The crankcase gases that are produced must be guided out of the system and the oil must be removed from them as completely as possible. The liquid separator may be inserted directly into the crankcase housing. For this purpose, a combination of cover and fitting in accordance with the invention may be used. The separating cartridge can also be integrated into an oil filter module.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter by way of example with reference to illustrative preferred embodiments shown in the accompanying drawings in which.

DETAILED DESCRIPTION OF PREFERRED EMBODIMENTS

Figure 1:
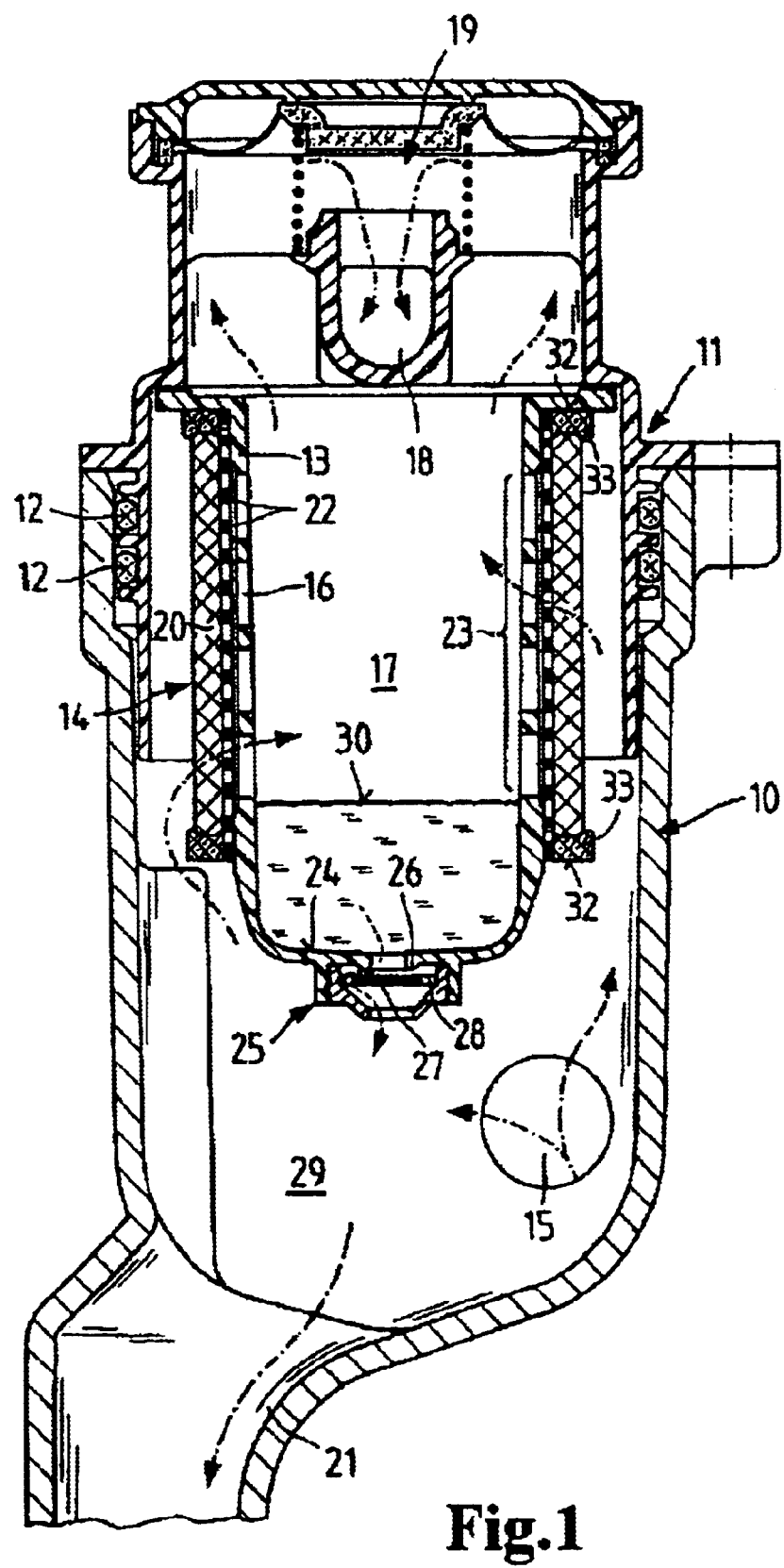
FIG. 1 is a cross section through the arrangement of the separating cartridge with two-component end disks in a separate housing.

The liquid separator depicted in FIG. 1 comprises a housing 10, into which a cover 11 is inserted, using O-rings 12. A mount 13 constructed as a nipple for a separating cartridge 14 is welded together with the cover 11.

The broken line arrows indicate the flow direction of the gases to be purified. These gases flow through an inlet 15 into the housing 10. They pass through the separating cartridge 14 and the passages 16 provided in mount 13 and thus reach the treated gas zone 17 of the liquid separator. After that, the gases exit the liquid separator through an outlet 18.

The outlet 18 is provided with a suction relief valve 19. When the liquid separator is used as an oil separator for crankcase gases of an internal combustion engine, this valve is necessary if the gases are supplied to the intake tract of the engine. If the negative pressure prevailing in this area becomes too great, the valve closes and thereby prevents excessive production of blowby gases in the crankcase.

The liquid is separated primarily in a nonwoven fabric 20 of the filter cartridge 14. From there it drips back into the housing 10 and exits the housing through a drain 21 that leads back to a crankcase housing (not shown). However, certain amounts of liquid may also be separated in a supporting member 22 and in an area 23 of the mount that is provided with passages 16. This liquid collects in the treated zone 17, which is formed by the nipple 13. For this purpose a return flow valve 25 is arranged at the base 24 of the mounting nipple. This return flow valve comprises a valve seat 26 and a valve plate 27 provided with recesses 28 along its edge. If the negative pressure between an untreated gas zone 29 and the treated gas zone 17 is lower than the hydrostatic pressure produced by a liquid level 30 of the separated oil, the return flow valve 25 opens so that the oil can drain off past the valve seat 26 through the recesses 28. This is the case, for instance, when the engine is stopped and is indicated by the dashed arrows. When the pressure equilibrium returns during operation of the engine, the valve plate 27 presses against the valve seat 26 so as to prevent a bypass flow of gas to be purified through the return flow valve (cf. FIG. 2).

The separating cartridge 14 comprises the cylindrical and gas permeable supporting member 22 onto which the nonwoven fabric 20 is loosely wound. The end faces 32 of these two components are embedded in end disks 33, which may be produced, for example, by using a two-component molding technique and which join the separating cartridge 14 to form a unitary assembly. The end disks 33 are elastic in radial direction. When the separating cartridge 14 is pushed onto the mount 13, a tight fit forming a seal between these components is created due to the radial expansion of the end disks. This interference fit fixes the separating cartridge in its mounted position.

Figure 2:
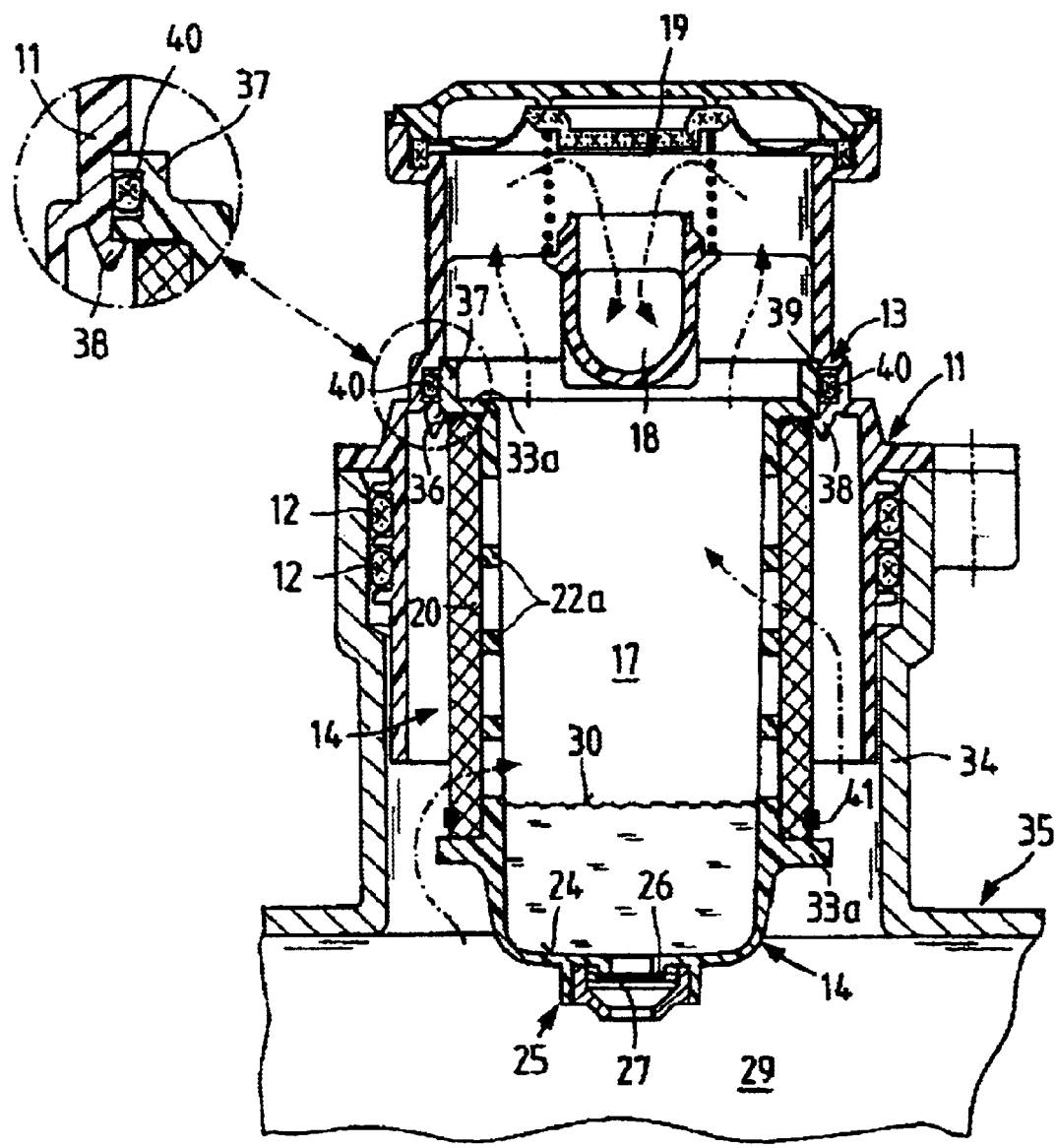
FIG. 2 is a cross section through a separating cartridge in a crankcase.

FIG. 2 shows an oil separator that is installed in a port 34. This port forms part of a crankcase housing 35 of an internal combustion engine (not shown). Thus, the untreated zone 29 is formed by the interior of the crankcase housing 35. Accordingly, the arrangement of a drain 21 and an inlet 15 is eliminated. The cover 11 has the same construction as in FIG. 1 except for the mount 13. The mount 13, however, is adapted to the different configuration of the separator according to FIG. 2.

The separating cartridge 14 has supporting member 22a and end disks 33a, which are made of plastic as a single piece, particularly by injection molding. The nonwoven fabric 20 is wound onto the resulting unit and is additionally fixed by gluing 36 or is compressed in the region of the end disks 33a. Compressing the nonwoven fabric is sufficient to prevent a partial flow of air from which the oil is to be removed from bypassing the nonwoven fabric. The compression of the nonwoven fabric can also be achieved mechanically instead of by gluing, e.g., by a cable tie 41. The lower end disk is adjoined by the base 24 of the nipple 23 while the upper end disk is provided with an extension 37 that matingly engages with the mount 13. The extension and the upper end disk have the same outside diameter. The separating cartridge 14 with the upper end disk is inserted into the mount 13 until the locking projections 38 snap around the underside of the upper end disk. This, in cooperation with a shoulder 39, axially fixes the separating cartridge 14 in place. The radial seal between mount 13 and the end disk is provided by the fit and may be supported by an additional seal 40, which may be accommodated in the cover 11 or in the extension 37 as shown in the detail of FIG. 2.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A liquid separator for separating liquid entrained in a gas flow, said separator comprising a housing with a cover having an inlet and an outlet for a gas to be purified and a drain for separated liquid; a mount for a separating cartridge; and a substantially cylindrical separating cartridge received on said mount; wherein said separating cartridge comprises a separating means wound around a support member with end disks on both axial end faces thereof; wherein said end disks engage the mount to form a seal and together with the support member form a sealed assembly which divides the separator into an untreated gas zone and a treated gas zone, and wherein the mount is constructed as a nipple that is gas permeable in the area between the end disks of the separating cartridge.

2. A liquid separator according to claim 1, wherein said separating means comprises a nonwoven fabric.

3. A liquid separator according to claim 1, wherein said gas flow comprises crankcase gases of an internal combustion engine.

4. A liquid separator according to claim 1, wherein the separating cartridge is completely non-metallic.

5. A liquid separator according to claim 1, wherein the separating means and the support member are embedded in at least one end disk made of nitrile-butadiene rubber.

6. A liquid separator according to claim 1, wherein at least one end disk is made of a multi-component synthetic resin material.

7. A liquid separator according to claim 1, wherein at least one end disk is bonded with an adhesive to the separating means and to the support member.

8. A liquid separator according to claim 7, wherein said separating means is a nonwoven fabric.

9. A liquid separator according to claim 1, wherein the separating means is compressed in the area of at least one end disk to form or support the seal.

10. A liquid separator according to claim 9, wherein said separating means is a nonwoven fabric.

11. A liquid separator according to claim 1, wherein the support member and at least one end disk are constructed as a single part.

12. A liquid separator according to claim 1, further comprising locking members provided where the end disks engage the mount to fix the separating cartridge in position.

13. A liquid separator according to claim 12, wherein said locking members are locking projections.

14. A liquid separator according to claim 1, wherein said mounting member is provided with a return flow valve for separated liquid.

15. A liquid separator according to claim 1, wherein the mounting member is firmly attached to the cover.

16. A liquid separator according to claim 15, wherein the mounting member is welded to the cover.

17. A substantially cylindrical separating cartridge comprising a separating means wound around a support member with end disks on both axial end faces thereof; wherein said end disks together with the support member are engagable with a mount to form a sealed assembly which divides a liquid separator into an untreated gas zone and a treated gas zone.

18. A liquid separator comprising a separating cartridge according to claim 17, integrated into an existing housing in an oil system of an internal combustion engine.

* * * * *